Figure 1:
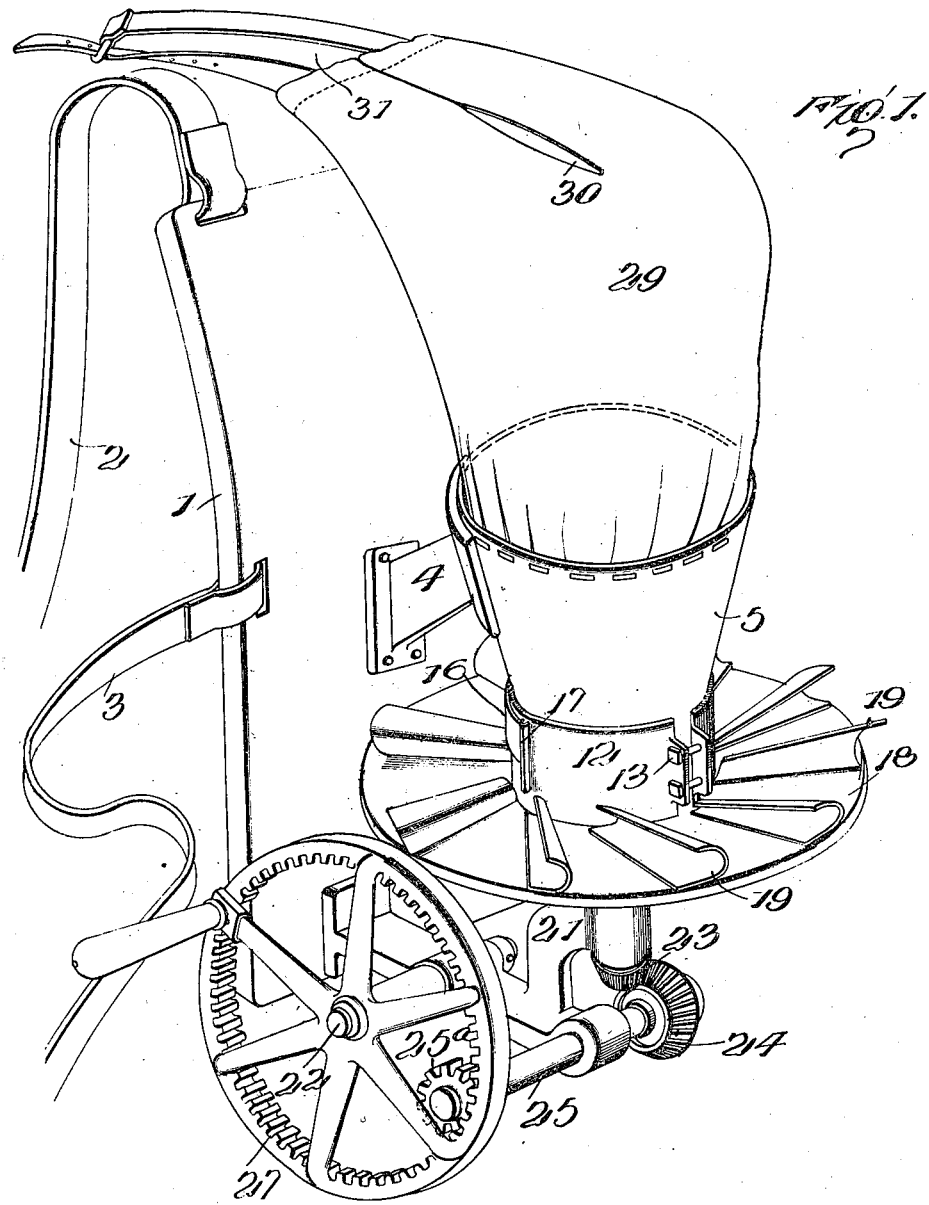

W. B. PARRISH.
HAND FERTILIZER AND SEED BROADCAST DISTRIBUTER.
APPLICATION FILED MAR. 16, 1915.

1,166,476.

Patented Jan. 4, 1916.
2 SHEETS—SHEET 1.

Witnesses
V. B. Hillyard.
W. N. Woodson.

Inventor
W. B. Parrish

By
Attorneys.

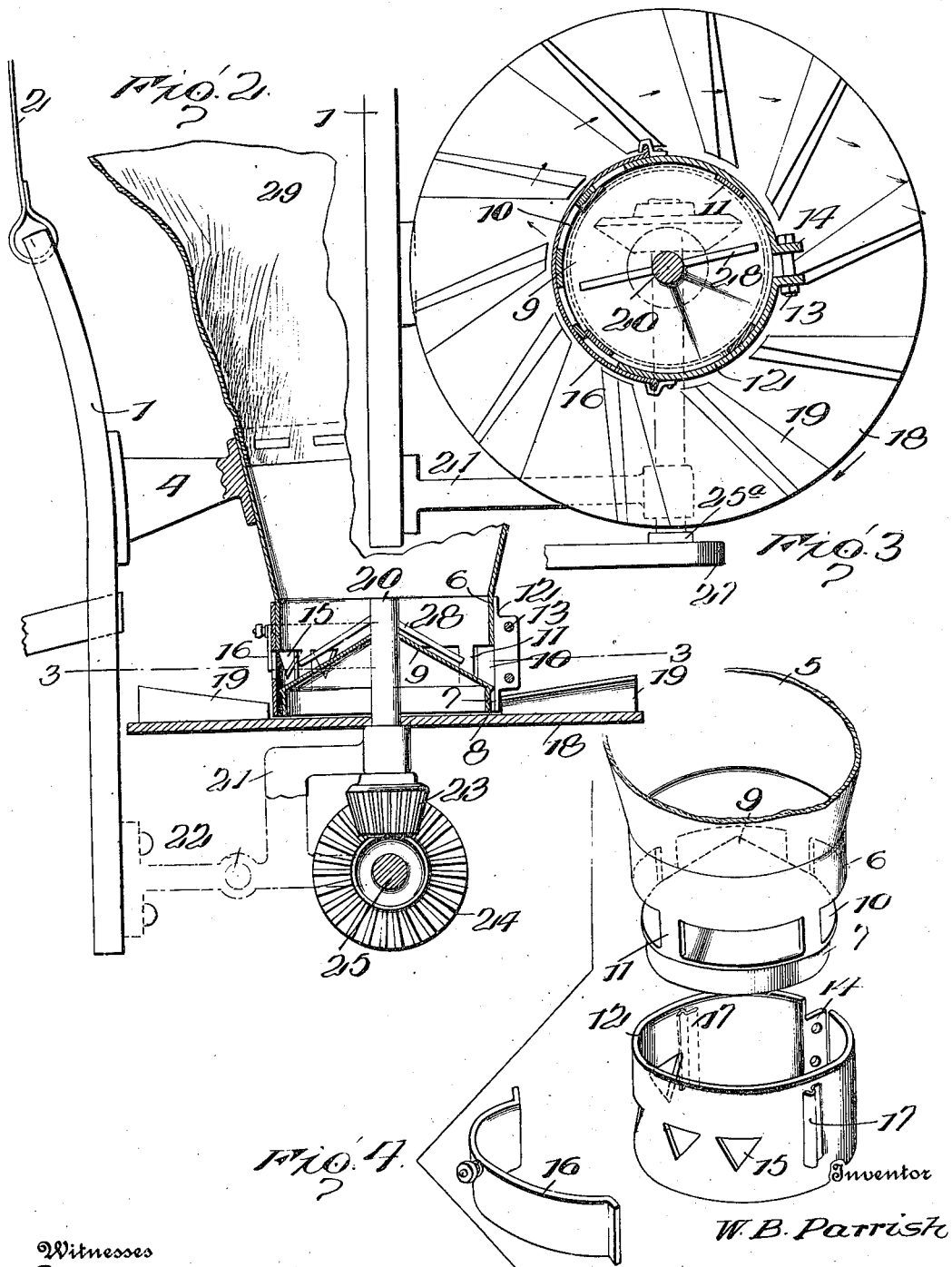

UNITED STATES PATENT OFFICE.

WASHINGTON B. PARRISH, OF KENBRIDGE, VIRGINIA.

HAND FERTILIZER AND SEED BROADCAST DISTRIBUTER.

1,166,476.

Specification of Letters Patent.

Patented Jan. 4, 1916.

Application filed March 16, 1915. Serial No. 14,685.

*To all whom it may concern:*

Be it known that I, WASHINGTON B. PARRISH, a citizen of the United States, residing at Kenbridge, in the county of Lunenburg and State of Virginia, have invented certain new and useful Improvements in Hand Fertilizer and Seed Broadcast Distributers, of which the following is a specification.

This invention is primarily intended to devise a machine for distributing seed and fertilizer broadcast, said machine being essentially hand operated and adapted to be set to throw the fertilizer or seed in any required direction, either laterally to one side or the other, or in advance of the operator, such machine being adjustable to adapt it to the nature of the seed or fertilizer to be sown.

The primary purpose of the invention is the provision of novel means whereby the discharge may be regulated, both with reference to quantity and direction, whereby any required amount of seed or fertilizer may be distributed per acre and in the desired direction so as to meet existing conditions.

A further purpose of the invention is the provision of a machine which is positive and certain in action and reliable in operation to deliver the amount of seed or fertilizer in the desired direction and according to the quantity to be delivered to a unit or given amount of surface.

A further purpose of the invention is the provision of a manually operable machine which may be conveniently carried and manipulated and which when set will throw the seed or fertilizer in advance of the operator.

With these and other objects in view, which will readily appear as the nature of the invention is better understood, the same consists in the improved construction and novel arrangement and combination of parts which will be hereinafter fully described and particularly claimed.

In the drawings has been illustrated a simple and preferred form of the invention, it being, however, understood that no limitation is necessarily made to the precise structural details therein exhibited, but that changes, alterations and modifications within the scope of the invention as claimed may be resorted to when desired.

Referring to the drawings, Figure 1 is a perspective view of a broadcast distributer embodying the invention; Fig. 2 is a vertical central longitudinal section, a portion of the hopper being broken away and the breast plate being shown in full lines; Fig. 3 is a horizontal section on the line 3—3 of Fig. 2, the cone being shown in full lines; Fig. 4 is a detail perspective view of the lower portion of the hopper, the regulating sleeve and the cut-off, said parts being separated and arranged in a group.

Corresponding and like parts are referred to in the following description and indicated in all the views of the drawings by the same reference characters.

The machine embodies a breast plate 1 which is so shaped as to conform approximately to the front of the torso and distribute the pressure thereon. Suitable shoulder straps 2 and a waist strap 3 are provided for attaching the breast plate to the body of the operator. A bracket 4 is attached to the front side of the breast plate 1 and supports a hopper 5 which is adapted to receive the seed, fertilizer or other material to be distributed. The hopper 5 is preferably made tapering and terminates at its lower end in a neck portion 6 which is of uniform diameter to admit of vertical adjustment of the regulating sleeve. The lower end of the neck 6 is open and is slightly contracted, as indicated at 7; the purpose being to provide an annular clearance space 8 for the escape of dust or other matter finding its way between the lower portions of the regulating sleeve and neck. A cone 9 is disposed in the lower portion of the neck 6 and is attached at its outer edge to the neck portion 6 about in the plane of the upper portion of the contracted part 7. A discharge 10 is formed in the neck portion 6 immediately above the juncture of the cone 9 therewith, the lower portion of the discharge 10 being flush with the cone 9 so as to prevent any obstruction to the ready escape of the seed, fertilizer or like material. The discharge 10 may be of any depth or circumferential extent and if desired may be interrupted by portions 11 of the neck which connect the parts of such neck above and below the discharge opening 10. A regulating sleeve 12 encircles the neck portion 6 of the hopper and is adapted to be secured in the adjusted position by any suitable means. As indicated, the sleeve 12 is split and is adapted to be contracted so as to clamp the neck 6. Bolts or fastenings 13 pass transversely through openings formed in offstanding portions 14 formed at the ends of the sleeve bordering upon the split. After the regulating sleeve has been moved to the required adjusted position it is made secure by tightening the bolts or fastenings 13.

A plurality of tapering openings 15 are formed at regular intervals in the length of the sleeve 12 and these openings are disposed in the plane of the discharge opening 10 and constitute the outlet for the seed, fertilizer or other material. The openings 15 are arranged with their points facing downward and their wide ends uppermost, hence by covering the upper portions of the openings 15 the effective size of the outlet may be regulated to the size of the seed or nature of the fertilizer or other material to be delivered. The openings 15 are formed in a portion only of the sleeve 12, thereby admitting of the sleeve being adjusted upon the neck portion 6 of the hopper so as to prevent rearward delivery of the seed or fertilizer while at the same time the sleeve may be turned to insure delivery of the seed or fertilizer in advance of the operator to one side or the other or directly in front. When the fastenings 13 are loosened the sleeve 12 may be turned about the neck portion 6 of the hopper to bring the openings 15 in the required position according to the direction of discharge of the seed, or fertilizer and after the sleeve 12 has been adjusted it is made secure by retightening the fastenings 13 so as to contract the sleeve and cause it to firmly and securely grip the neck 6.

A cut-off 16 is provided for regulating the effective size of the outlet. The cut-off 16 is curved to fit snugly against the outer side of the regulating sleeve 12 and is mounted thereon so as to move vertically to cover the upper portions of the openings 15 more or less with the result that the size of the outlet may be regulated to suit the size of the seed or the fertilizer or other material to be distributed. Proper adjustment of the cut-off 16 also provides for regulating the amount of the seed or fertilizer to be distributed per acre or to a given surface of ground. Suitable guides 17 are provided upon the outer side of the sleeve 12 at the ends of the line of openings 15 and these guides receive the ends of the cut-off 16 which latter is held in place by the guides and directed in its movements thereby. The cut-off 16 being resilient, sufficient friction is created between such cut-off and the sleeve 12 and guides 17 to hold the cut-off in the required adjusted position. In this connection it is to be noted that if found necessary positive means may be employed for securing the cut-off in the located position against casual movement.

A spreader or distributer is located immediately below the neck portion of the hopper and the regulating sleeve and comprises a circular plate or disk 18 and wings or blades 19, the latter having an approximate tangential arrangement as indicated most clearly in Fig. 3 and tapering from their inner to their outer ends and curving between the longitudinal edges. The blades or wings 19 are arranged with their concave or hollow sides facing forward or in the direction of rotation of the spreader and flare from their inner to their outer ends so as to spread the seed, fertilizer or the like and insure a uniform and broadcast delivery. The spreader or distributer is secured to a vertical shaft 20 which passes centrally through the cone 9 and hopper 5, said shaft being mounted near its lower end in a bracket 21 which is secured to the lower portion of the breast plate 1. The spreader or distributer is secured to the shaft 20 so as to rotate therewith. The inner ends of the blades 19 touch or come close to the outer side of the regulating sleeve so as to receive the seed or fertilizer immediately upon its delivery through the outlet 15. The upper side of the disk or plate 18 is in contact with the lower ends of the neck 6 and sleeve 12 so as to prevent any of the material passing to the center of the disk. A gear wheel 24 is in mesh with the teeth of the pinion 23 and is secured to a horizontal shaft 25 which is mounted in a part of the bracket 21. An internally toothed crank wheel 27 is secured to the outer end of a shaft 22 mounted in the bracket 21. A pinion 25$^a$ is attached to the outer end of the horizontal shaft 25 and is in mesh with the teeth of the wheel 27 and serves as convenient means for rotating such shaft and the vertical shaft 20 through the intermediate gearing 23 and 24. Fingers 28 are attached to the vertical shaft 20 and constitute agitators to prevent banking of the seed or fertilizer within the hopper. A flexible tube 29 of textile is attached to the upper end of the hopper 5 and may serve as an extension thereof to hold the material. An opening 30 is formed in the upper closed end of the tube to admit of filling the hopper. Straps 31 attached to the upper end of the tube 29 pass around the neck of the operator and support the tube.

In the practical operation of the invention the device is disposed in front of the operator with the breast plate 1 resting against the body and held in place by means of the straps 2 and 3. The fertilizer, seed, plaster or other material to be delivered is placed in the hopper 5. The regulating sleeve 12 is adjusted so as to effect delivery of the material in the required direction, either to one side or the other, or directly in front of the operator, and the cut-off 16 is adjusted to the amount to be delivered to a given surface. The regulating devices, such as the sleeve 12 and cut-off 16 having been set and the hopper being supplied with the material in bulk, the operator moves over the field to be fertilized or sown with seed and the shaft 25 is rotated at the proper speed by means of the crank 27. The seed or fertilizer passes from the hopper through the outlet 15 upon the inner portion of the disk 18 and is thrown outward by the blades 19. The rotation of the distributer and the outward flare of the blades 19 result in a broadcast delivery of the seed, fertilizer or other material.

It is noted that the machine by reason of its peculiar construction may be formed of galvanized iron or like sheet metal properly treated to render it rust proof, hence the machine is both light, durable and strong and capable of resisting the erosive action of acid fertilizers, such as phosphates. It is further noted that the adjustment is simple and may be readily effected so that the delivery may be directly in advance or to one side or the other and, furthermore, may be regulated as to the quantity to be delivered to a given surface.

Having thus described the invention, what is claimed as new is:—

1. In a device of the character specified, the combination of a hopper having a lateral discharge, a regulating sleeve fitted upon the hopper and having an opening in register with the discharge and adjustable to any angular position, and a cut-off for regulating the effective size of the outlet opening of the sleeve mounted upon the latter and movable therewith.

2. In a device of the character specified, the combination of a hopper having a discharge, a sleeve provided with an opening in register with the discharge and adjustable circumferentially about the hopper to throw the outlet in any angular position according to the desired delivery of the material from the hopper, and a cut-off mounted upon the sleeve and adjustable vertically to vary the effective size of the outlet.

3. A device of the character specified comprising a hopper having a lateral discharge, a cone disposed within the lower portion of the hopper for directing the contents therefrom through the discharge, and a regulating sleeve having an opening in register with the discharge of the hopper and adjustable to throw the opening to any angular position.

4. In a device of the character specified, the combination of a hopper having a lateral discharge, a cone disposed within the hopper for directing the contents therefrom through the lateral discharge, a cone disposed within the hopper for directing the contents therefrom through the lateral discharge, a sleeve adjustable circularly about the hopper and having an opening in register with the discharge thereof to admit of controlling the direction of delivery and a rotary spreader for scattering the material broadcast in the required direction.

5. In a device of the character specified, the combination of a hopper having a circular neck portion at its lower end and in which is formed a lateral discharge, a sleeve fitted upon the neck portion and adjustable thereabout circularly and formed with an opening in register with the discharge of the hopper, a cut-off movable upon the sleeve lengthwise thereof to regulate the outlet of the discharge opening, and a rotary spreader for distributing broadcast the material delivered from the hopper.

6. In a device of the character specified, the combination of a hopper having a circular neck portion at its lower end in which is formed a discharge, said neck portion having the part below the discharge contracted, a cone within the neck of the hopper for directing the material through the discharge, a sleeve adjustable about the neck portion of the hopper and having an opening to register with the said discharge, and a rotary spreader for distributing the material broadcast delivered thereto from the hopper.

In testimony whereof I affix my signature in presence of two witnesses.

WASHINGTON B. PARRISH. [L. s.]

Witnesses:
D. T. KENNEDY,
A. B. SHACKLETON.